US009783273B2

(12) United States Patent
Lin et al.

(10) Patent No.: US 9,783,273 B2
(45) Date of Patent: Oct. 10, 2017

(54) CARRYING DEVICE FOR SIDE-SCAN SONAR

(71) Applicant: Dalian University of Technology, Dalian (CN)

(72) Inventors: Yan Lin, Dalian (CN); Ming Chen, Dalian (CN); Yanyun Yu, Dalian (CN); Yunlong Wang, Dalian (CN); Kai Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 266 days.

(21) Appl. No.: 14/696,501

(22) Filed: Apr. 27, 2015

(65) Prior Publication Data
US 2015/0225047 A1   Aug. 13, 2015

Related U.S. Application Data

(63) Continuation-in-part of application No. PCT/CN2013/001233, filed on Oct. 14, 2013.

(30) Foreign Application Priority Data

Oct. 26, 2012 (CN) .............................. 201210416175

(51) Int. Cl.
*A47F 5/00* (2006.01)
*B63B 49/00* (2006.01)
(Continued)

(52) U.S. Cl.
CPC .............. *B63B 49/00* (2013.01); *G01S 7/521* (2013.01); *G01S 15/88* (2013.01);
(Continued)

(58) Field of Classification Search
CPC ......... B63B 49/00; G01S 7/521; G01S 15/88; G01S 15/158902; G10K 11/008; Y10T 29/511
(Continued)

(56) References Cited

U.S. PATENT DOCUMENTS 4,144,518 A * 3/1979 Minohara ............ G10K 11/355
                                                    367/12
4,928,915 A * 5/1990 Havins .................. G10K 11/006
                                                    248/288.31
(Continued)

FOREIGN PATENT DOCUMENTS

GB         2117904 A * 10/1983 ............. G01S 7/521

*Primary Examiner* — Gwendolyn Baxter
(74) *Attorney, Agent, or Firm* — Matthias Scholl, PC; Matthias Scholl

(57) ABSTRACT

A carrying device for a side-scan sonar, including a suspension rod, a hanging rack, and a flange. The side-scan sonar is in fixed connection to the lower part of the hanging rack. The suspension rod includes a suspension unit, a universal joint, and a tension rod. The flange is disposed below the lower part of the tension rod. The hanging rack includes a Z-shaped main cross beam. Two U-shaped hooks are disposed at two ends of the Z-shaped main cross beam for supporting the side-scan sonar. A vertical drag hook is disposed in the inner side of each of the two U-shaped hooks for hanging the side-scan sonar. The flange is fixed in the center of the Z-shaped main cross beam.

6 Claims, 4 Drawing Sheets

(51) Int. Cl.
*G10K 11/00* (2006.01)
*G01S 15/88* (2006.01)
*G01S 7/521* (2006.01)
*G01S 15/89* (2006.01)

(52) U.S. Cl.
CPC ........ *G01S 15/8902* (2013.01); *G10K 11/008* (2013.01); *Y10T 29/511* (2015.01)

(58) Field of Classification Search
USPC .................... 248/288.31, 642; 367/173, 642
See application file for complete search history.

(56) References Cited

U.S. PATENT DOCUMENTS

| | | | | |
|---|---|---|---|---|
| 4,979,153 | A * | 12/1990 | Terry .................... | A01K 79/00 340/573.2 |
| 5,142,497 | A * | 8/1992 | Warrow ............... | G10K 11/006 367/12 |
| 7,036,451 | B1 * | 5/2006 | Hutchinson ............ | B63B 17/00 114/364 |
| 2002/0013106 | A1 * | 1/2002 | Healey ................ | B63H 20/007 440/6 |

* cited by examiner

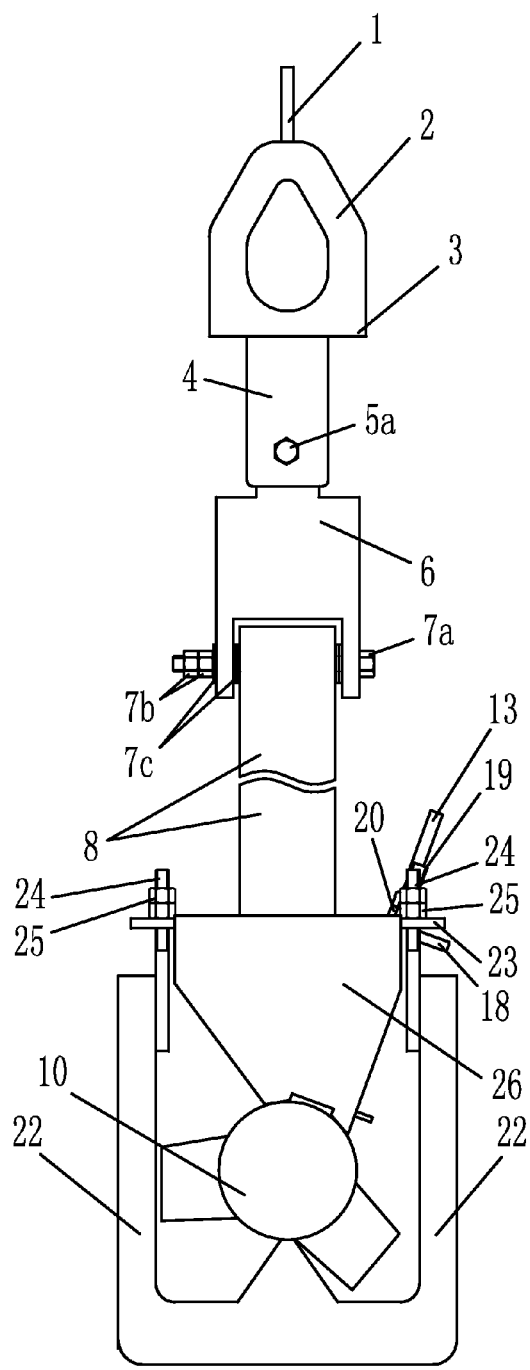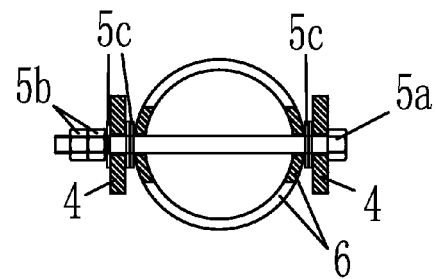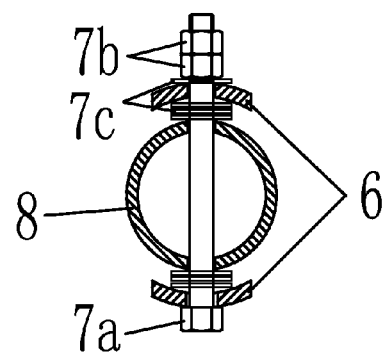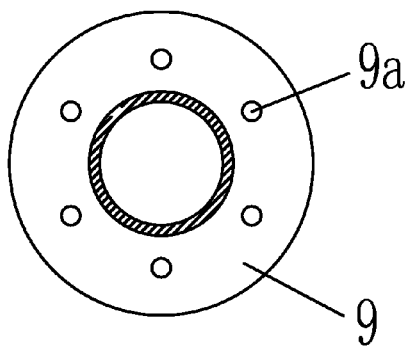
FIG. 3
FIG. 4
FIG. 5
FIG. 6

CARRYING DEVICE FOR SIDE-SCAN SONAR

CROSS-REFERENCE TO RELATED APPLICATIONS

This application is a continuation-in-part of International Patent Application No. PCT/CN2013/001233 with an international filing date of Oct. 14, 2013, designating the United States, now pending, and further claims priority benefits to Chinese Patent Application No. 201210416175.1 filed Oct. 26, 2012. The contents of all of the aforementioned applications, including any intervening amendments thereto, are incorporated herein by reference.

BACKGROUND OF THE INVENTION

Field of the Invention

The invention relates to a carrying device for a side-scan sonar.

Description of the Related Art

Typically, a side-scan sonar floating in water is drawn via a line. However, the connection mode exposes the side-scan sonar to environmental factors such as wind, waves, and current, so that the detection posture often varies randomly, adversely affecting the detection precision and measurement results.

SUMMARY OF THE INVENTION

In view of the above-described problems, it is one objective of the invention to provide a carrying device for a side-scan sonar featuring a simple structure, convenient assembly and disassembly, high intensity and rigidity, light weight, reliable operation, easy maintenance, and resistance to interference from wind, waves, and current.

The carrying device can be hung at a wharf, at a side of a hull, or at the rear of a hull, can adjust the measurement angles by self-adjustment to ensure the optimal measurement posture, thereby improving the measurement accuracy and measurement results.

To achieve the above objective, in accordance with one embodiment of the invention, there is provided a carrying device for a side-scan sonar, comprising a suspension rod and a hanging rack. The side-scan sonar is in fixed connection to a lower part of the hanging rack. The suspension rod comprises a suspension unit, a universal joint, and a tension rod, all of which are hinged; a flange is disposed below a lower part of the tension rod; the hanging rack comprises a Z-shaped main cross beam; two U-shaped hooks are disposed at two ends of the Z-shaped main cross beam for supporting the side-scan sonar; a vertical drag hook is disposed in an inner side of each of the two U-shaped hooks for hanging the side-scan sonar; and the flange is fixed in a center of the Z-shaped main cross beam.

In a class of this embodiment, the suspension unit comprises a triangle lifting lug, two pear-shaped side plates comprising lightening holes, and a rectangular baseplate, and the two pear-shaped side plates are welded on the rectangular baseplate in an I-shaped structure; and two rectangular eye plates are perpendicularly welded on a bottom surface of the rectangular baseplate.

In a class of this embodiment, two forked structures are disposed at two ends of the universal joint, respectively, and the two forked structures are perpendicular to each other.

In a class of this embodiment, the Z-shaped main cross beam comprises two wide plates and two narrow plates; the two wide plates are combined to form an angle of 70 degrees; and the two narrow plates are perpendicular to the two wide plates, respectively.

In a class of this embodiment, a cone-shaped protrusion is formed at an inner bottom of the two U-shaped hooks to support a bottom part of the side-scan sonar.

In another aspect, the invention further provides a method for assembling the carrying device for a side-scan sonar, the method comprising:

a) determining an operating water depth of the side-scan sonar;

b) selecting a hanging position for the suspension rod at a wharf or at a side of a hull, and determining a hanging height of the hanging unit at the top of the suspension rod;

c) assembling the suspension rod, adjusting the rotation sensitivity of the universal joint, and hanging the suspension rod vertically using a lifting device;

d) assembling the hanging rack;

e) hooking the suspension eye plate using the lifting device to allow the hanging rack to be slightly higher than a section height of the side-scan sonar;

f) hanging the hanging ring of the side-scan sonar on the drag hook, and adjusting a vertical position of the drag hook through the third nut to enable the drag hook to hook the side-scan sonar;

g) installing the U-shaped hooks at two ends of the Z-shaped main cross beam, lifting the side-scan sonar through the fourth bolts until an upper limb of a cross section of the side-scan sonar leans against the vertical stop plates;

h) adjusting again the vertical position of the drag hook through the third nut to enable the drag hook to hook tightly the hanging ring of the side-scan sonar;

i) aligning the six second screw holes of the flange with the six first screw holes 12 of the hanging rack, and fastening the screw holes using bolts; and j) lifting up the carrying device carrying the side-scan sonar using the lifting device and slowly placing the carrying device in a target water vertically.

Advantages according to embodiments of the invention are summarized as follows. The carrying device comprises a suspension rod and a hanging rack. The suspension rod comprises a suspension unit, a universal joint, a vertical tension rod, and a flange. The hanging rack comprises a Z-shaped main cross beam, anti-torque and anti-bending components, vertical fixing components, and axial fixing components. The side-scan sonar is tightly fixed on the hanging rack. The suspension rod and the hanging rack are fastened using screw holes and bolts. The carrying device features a reasonable design, a simple structure, convenient assembly and disassembly, high intensity and rigidity, light weight, reliable operation, easy maintenance, and can resist the interference from wind, wave, and current. The carrying device can be hung at a wharf, at a side of a hull, or at the rear of a hull, can adjust the measurement angles by self-adjustment to ensure the optimal measurement posture, thereby improving the measurement accuracy and measurement results.

BRIEF DESCRIPTION OF THE DRAWINGS

The invention is described hereinbelow with reference to the accompanying drawings, in which:

FIG. 3 is a side view of a carrying device for a side-scan sonar according to one embodiment of the invention;

FIG. 4 is a cross sectional view taken from line A1-A1 of FIG. 1;

FIG. 5 is a cross sectional view taken from line B1-B1 of FIG. 1;

FIG. 6 is a cross sectional view taken from line C1-C1 of FIG. 1;

Figure 1:
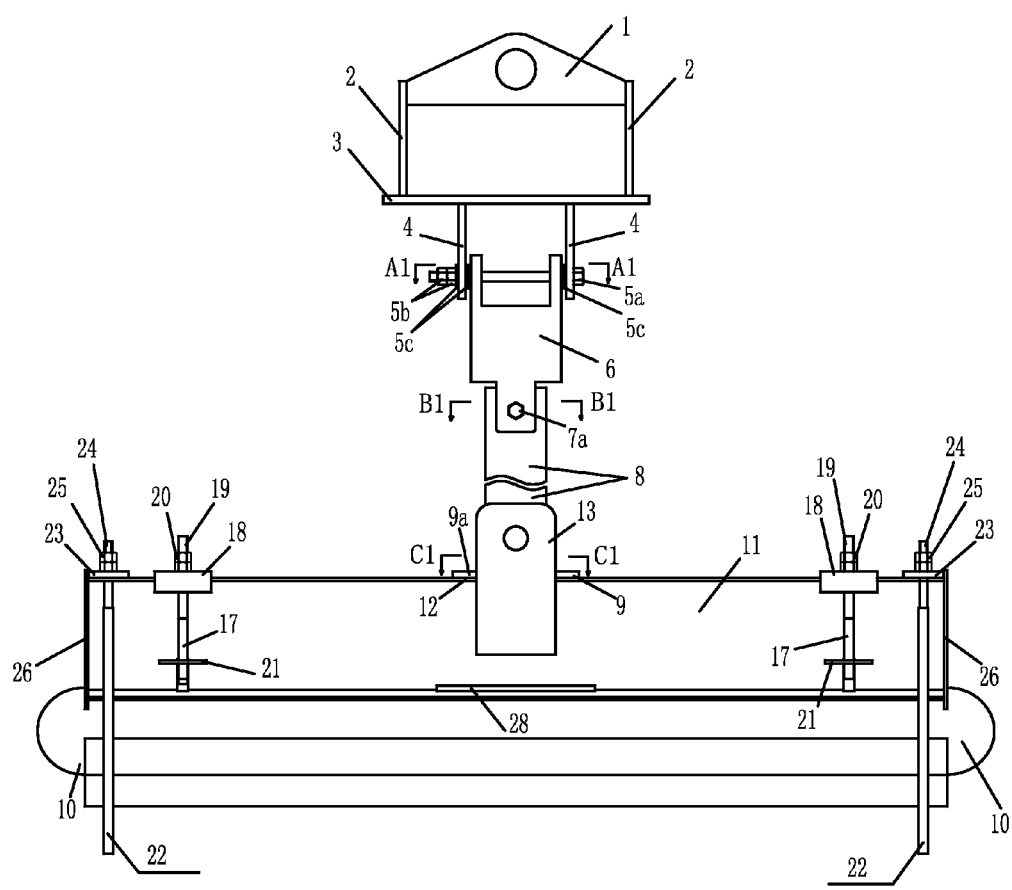
FIG. 1 is a front view of a carrying device for a side-scan sonar according to one embodiment of the invention.

In the drawings, the following reference numbers are used: 1. Lifting lug; 2. Side plate; 3. Baseplate; 4. Eye plate; 5a. First bolt; 5b. First nut; 5c. First washer; 6. Universal joint; 7a. Second bolt; 7b. Second nut; 7c. Second washer; 8. Tension rod; 9. Flange; 9a Second screw hole; 10. Side-scan sonar; 11. Z-shaped main cross beam; 12. First screw hole; 13. Suspension eye plate; 14. Large vertical knee plate; 15. Torsional plate; 16. Small vertical knee plate; 17. Drag hook; 18. Folded eye plate; 19. Third bolt; 20. Third nut; 21. Concave guide plate; 22. U-shaped hook; 23. Horizontal eye plate; 24. Fourth bolt; 25. Fourth nut; 26. Vertical stop plate; 27. Block; 28. Rectangular opening.

DETAILED DESCRIPTION OF THE EMBODIMENTS

For further illustrating the invention, experiments detailing a carrying device for a side-scan sonar are described below. It should be noted that the following examples are intended to describe and not to limit the invention.

Figure 2:
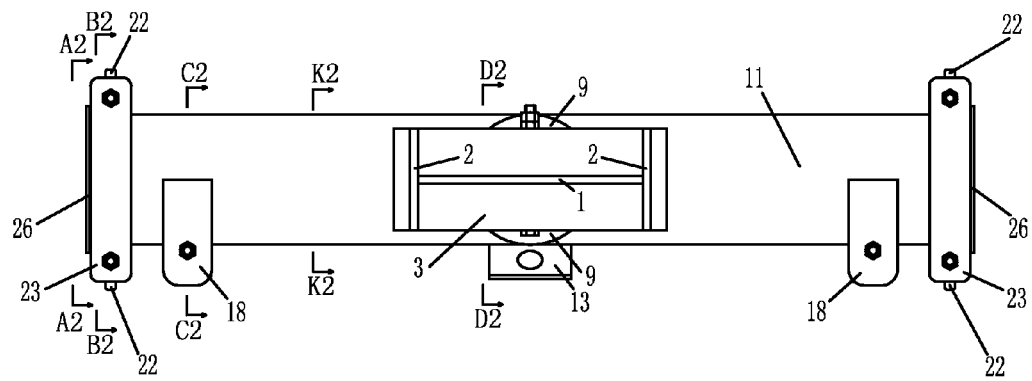
FIG. 2 is a top view of a carrying device for a side-scan sonar according to one embodiment of the invention.

FIGS. 1, 2, and 3 show schematic diagrams of a carrying device for a side-scan sonar. The carrying device comprises a suspension rod and a hanging rack. A flange 9 is connected to a rail of the suspension rod. A plurality of first screw holes 12 are disposed in the center of the hanging rack. The flange 9 and the first screw holes 12 are fixed and fastened by bolts.

The suspension rod comprises a suspension unit at the top thereof. The suspension unit comprises a triangle lifting lug 1, two pear-shaped side plates 2 comprising lightening holes, and a rectangular baseplate 3, all of which are welded to form the suspension unit. Two rectangular eye plates 4 are perpendicularly welded on the bottom surface of the rectangular baseplate 3. The two rectangular eye plates 4 are connected to a hollow tubular universal joint 6 via first bolts 5a, first nuts 5b, and first washers 5c (as shown in FIG. 4). A hollow tubular tension rod 8 is connected to a lower part of the hollow tubular universal joint 6 and is fastened via a second bolt 7a, a second nut 7b, and a second washer 7c (as shown in FIG. 5). The flange 9 comprises six second screw holes 9a (as shown in FIG. 6) and is welded at a lower part of the hollow tubular tension rod 8. The six second screw holes 9a of the flange 9 correspond to the six first screw holes 12 of the hanging rack. A length of the hollow tubular tension rob 8 is determined by the underwater depth of the side-scan solar 10 and the fixing position of the suspension unit. The hollow tubular universal joint 6 can rotate from two directions with certain angles, so to as adjust the spatial angle through self-adjustment. All sharp corners of the components should be rounded.

Figure 7:
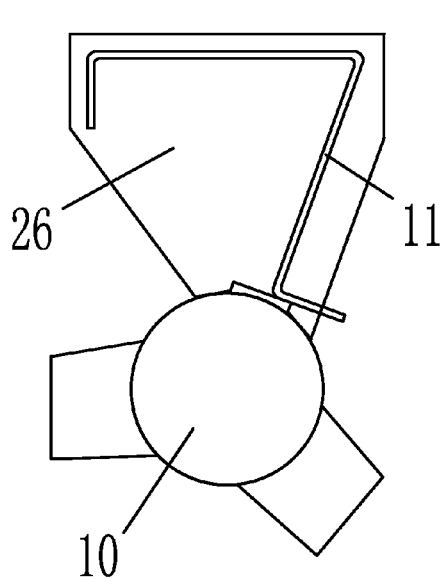
FIG. 7 is a cross sectional view taken from line A2-A2 of FIG. 2.
Figure 8:
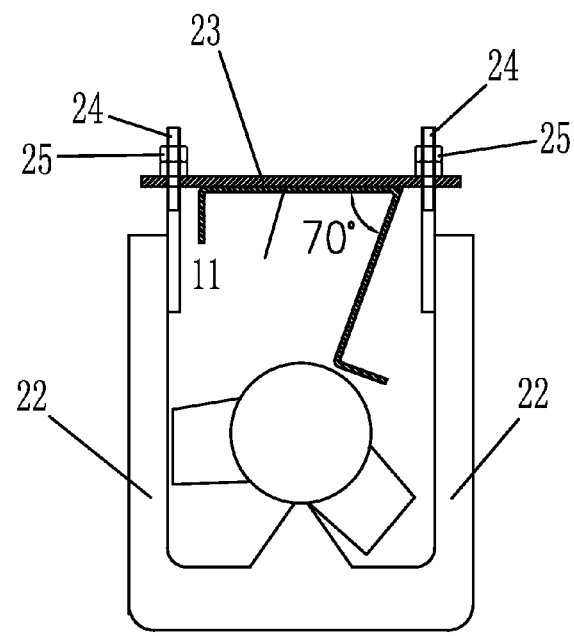
FIG. 8 is a cross sectional view taken from line B2-B2 of FIG. 2.
Figure 9:
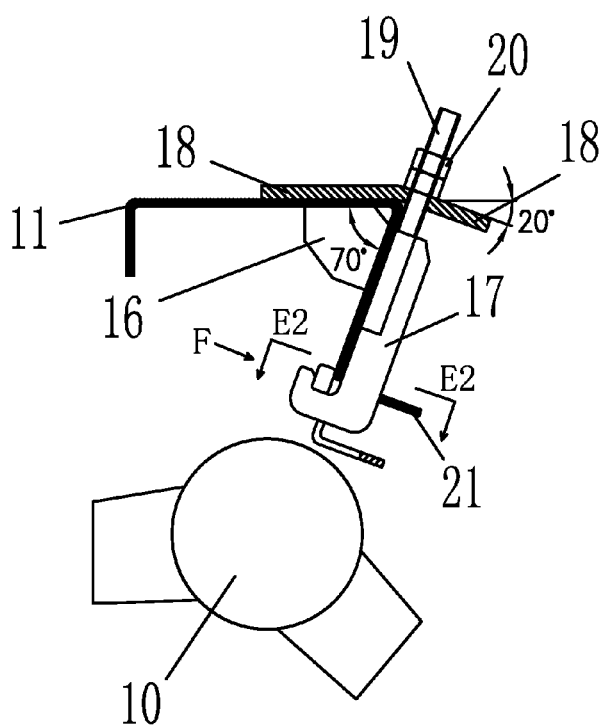
FIG. 9 is a cross sectional view taken from line C2-C2 of FIG. 2.
Figure 10:
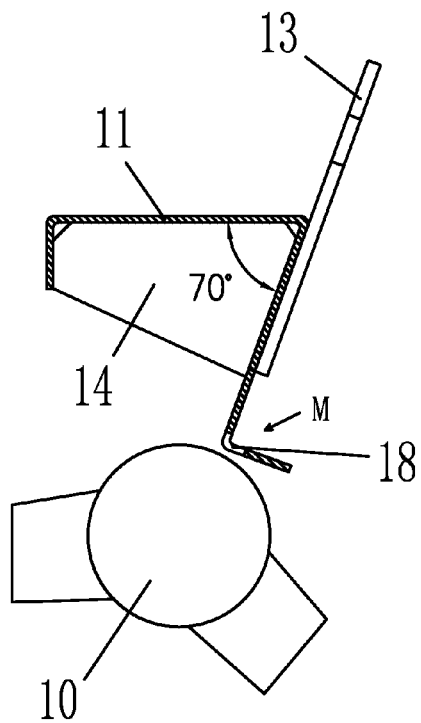
FIG. 10 is a cross sectional view taken from line D2-D2 of FIG. 2.
Figure 11:
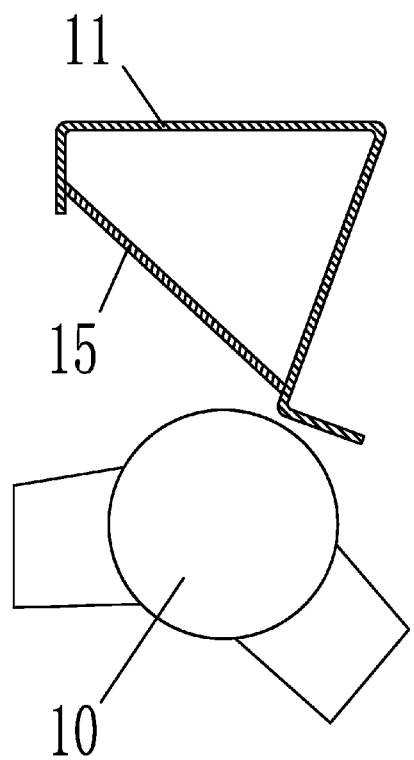
FIG. 11 is a cross sectional view taken from line K2-K2 of FIG. 2.
Figure 12:
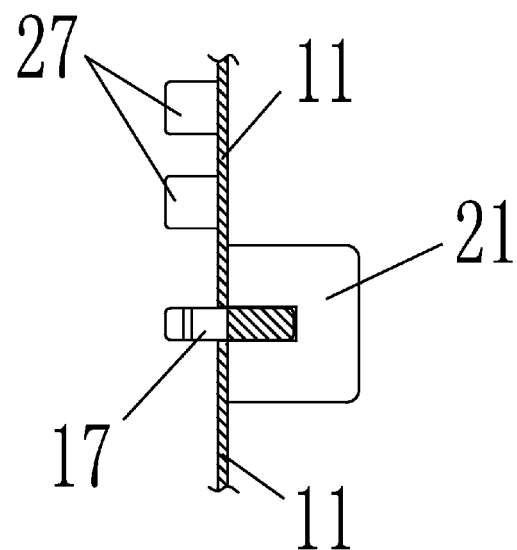
FIG. 12 is a cross sectional view taken from line E2-E2 of FIG. 9.
Figure 13:
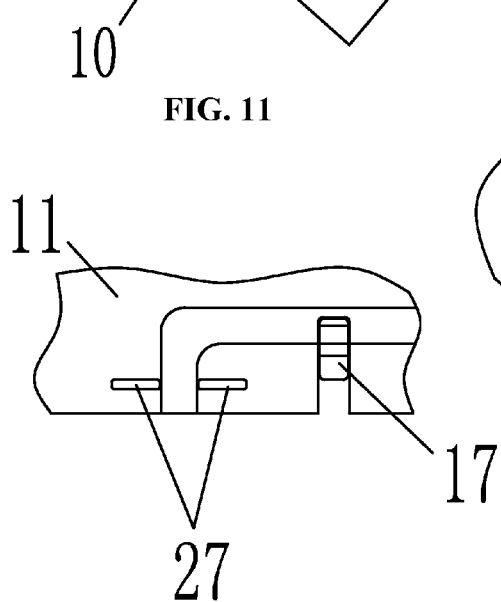
FIG. 13 is a cross sectional view taken from direction F of FIG. 9.
Figure 14:
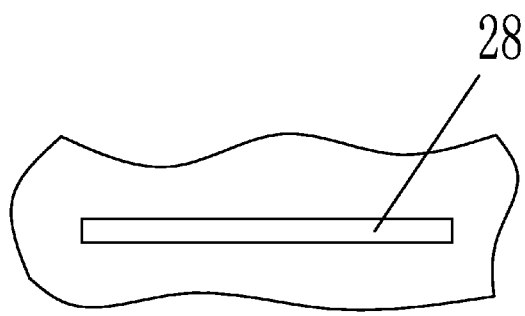
FIG. 14 is a cross sectional view taken from direction M of FIG. 10.

The hanging rack comprises a Z-shaped main cross beam 11 comprising two wide plates and two narrow plates. The two wide plates are combined to form an angle of 70 degrees, which is the optimal working angle for the side-scan sonar 10 (as shown in FIG. 7). The two narrow plates are perpendicular to the two wide plates, respectively. The six first screw holes 12 of the hanging rack are disposed at the center of the horizontal plate of the Z-shaped main cross beam 11 and correspond to the six second screw holes 9a of the flange 9 at the lower part of the suspension rod. The six second screw holes 9a of the flange 9 and the six first screw holes 12 are fixed and fastened by bolts. A suspension eye plate 13 is welded on a beveled plate of the Z-shaped main cross beam 11 in the vicinity of the center line thereof. The suspension eye plate 13 comprises a round hole functioning as an assistant hanging point for the connection and installation of the hanging rack and the suspension rod. The round hole also plays a role for fastening the hanging rack (as shown in FIG. 10). Two large vertical knee plates 14 are welded to the lower part of the Z-shaped main cross beam 11 outside the first screw holes 12 (as shown in FIG. 10). A torsional plate 15 is welded to the lower part of the Z-shaped main cross beam 11 at the central line symmetry position (as shown in FIG. 11). A 160° folded eye plate 18 is welded on the Z-shaped main cross beam 11 and is provided with a bolt hole. Two small vertical knee plates 16 are welded to the lower part of the Z-shaped main cross beam 11 at the 160° folded eye plate 18 (as shown in FIG. 9). The large vertical knee plates 14, torsional plate 15, and small vertical knee plates 16 are components for producing torque resistance, bending resistance, and reinforcing local connection. A vertical drag hook 17 is welded on a third bolt 19. The third bolt 19 passes through the bolt hole of the folded eye plate 18. The vertical position of the drag hook 17 is adjusted by a third nut 20. A concave guide plate 21 is buckled on the arm of the drag hook 17 and welded perpendicularly to the beveled plate of the Z-shaped main cross beam 11. The concave guide plate 21 guides the drag hook 17 to move upward and downward. The first step for installing the side-scan sonar 10 on the hanging rack is to hang the side-scan sonar on the drag hook 17. Two U-shaped hooks 22 are disposed at two ends of the Z-shaped main cross beam 11, respectively. A cone-shaped protrusion is formed at the inner bottom of the two U-shaped hooks 22 to support the bottom part of the side-scan sonar 10 (as shown in FIG. 8). Horizontal eye plates 23 are welded on the horizontal panels at two ends of the Z-shaped main cross beam 11, respectively. The horizontal eye plates 23 comprise bolt holes at two ends thereof. Fourth bolts 24 are welded at upper parts of the U-shaped hooks 22, respectively. The fourth bolts 24 pass through the bolt holes of the horizontal eye plates 23. The vertical position of the U-shaped hooks 22 is adjusted through fourth nuts 25, that is, to adjust the vertical height of the side-scan sonar 10 (as shown in FIG. 8). Vertical stop plates 26, also called end plates, are welded at two ends of the Z-shaped main cross beam 11. The vertical stop plates cooperate with the U-shaped hooks 22 to clamp the side-scan sonar 10. The drag hooks 17, U-shaped hooks 22, and vertical stop plates 26 are vertical fixing components. Two blocks 27 seize a hanging ring of the side-scan sonar 10 so as to limit the side-scan sonar 10 horizontally (axially) (as shown in FIGS. 12 and 13). A rectangular opening 28 is disposed at the center line of the Z-shaped main cross beam 11 in the vicinity of the lower right-angle side to allow the hanging ring of the side-scan sonar 10 to pass through (as shown in FIG. 14).

The assembly method of the carrying device for the side-scan sonar comprises:

a) determining an operating water depth of the side-scan sonar 10;

b) selecting a hanging position for the suspension rod at a wharf or at a side of a hull, and determining a hanging height of the hanging unit at the top of the suspension rod;

c) assembling the suspension rod, adjusting the rotation sensitivity of the universal joint 6, and hanging the suspension rod vertically using a lifting device;

d) assembling the hanging rack;

e) hooking the suspension eye plate 13 using the lifting device to allow the hanging rack to be slightly higher than a section height of the side-scan sonar 10;

f) hanging the hanging ring of the side-scan sonar 10 on the drag hook 17, and adjusting a vertical position of the drag hook 17 through the third nut 20 to enable the drag hook 17 to hook the side-scan sonar 10;

g) installing the U-shaped hooks 22 at two ends of the Z-shaped main cross beam 11, lifting the side-scan sonar 10 through the fourth bolts 24 until an upper limb of a cross section of the side-scan sonar 10 leans against the vertical stop plates 26;

h) adjusting again the vertical position of the drag hook 17 through the third nut 20 to enable the drag hook 17 to hook tightly the hanging ring of the side-scan sonar 10;

i) aligning the six second screw holes 9a of the flange 9 with the six first screw holes 12 of the hanging rack, and fastening the screw holes using bolts; and j) lifting up the carrying device carrying the side-scan sonar 10 using the lifting device and slowly placing the carrying device in a target water vertically.

The disassembly of the carrying device of the side-scan sonar is just reverse to the assembly of the carrying device.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A carrying device for a side-scan sonar, comprising:
a) a suspension rod, the suspension rod comprising a suspension unit, a universal joint, and a tension rod;
b) a hanging rack, the hanging rack comprising a Z-shaped main cross beam;
c) a flange;
d) two U-shaped hooks; and
e) a vertical drag hook;
wherein:
the side-scan sonar is adapted to be in fixed connection to a lower part of the hanging rack;
the suspension unit, the universal joint, and the tension rod are hinged to one another;
the flange is disposed below a lower part of the tension rod;
the two U-shaped hooks are respectively disposed at two ends of the Z-shaped main cross beam for supporting the side-scan sonar;
the vertical drag hook is disposed in an inner side of each of the two U-shaped hooks for hanging the side-scan sonar; and
the flange is fixed to a center of the Z-shaped main cross beam.

2. The device of claim 1, wherein the suspension unit comprises a triangle lifting lug, two pear-shaped side plates comprising lightening holes, and a rectangular baseplate, and the two pear-shaped side plates are welded on the rectangular baseplate to form an I-shaped structure; and two rectangular eye plates are perpendicularly welded on a bottom surface of the rectangular baseplate.

3. The device of claim 1, wherein two forked structures are disposed at two ends of the universal joint, respectively, and the two forked structures are perpendicular to each other.

4. The device of claim 1, wherein the Z-shaped main cross beam comprises two wide plates and two narrow plates; the two wide plates are combined to form an angle of 70 degrees; and the two narrow plates are perpendicular to the two wide plates, respectively.

5. The device of claim 1, wherein a cone-shaped protrusion is formed at an inner bottom of the two U-shaped hooks to support a bottom part of the side-scan sonar.

6. A method for assembling a carrying device for a side-scan sonar of claim 1, the method comprising:
a) determining an operating water depth of the side-scan sonar;
b) selecting a hanging position for the suspension rod at a wharf or at a side of a hull, and determining a hanging height of a hanging unit of the suspension rod;
c) assembling the suspension rod, adjusting a rotation sensitivity of the universal joint, and hanging the suspension rod vertically using a lifting device;
d) assembling the hanging rack;
e) hooking a suspension eye plate of the hanging rack using the lifting device to allow the hanging rack to be slightly higher than a section height of the side-scan sonar;
f) hanging a hanging ring of the side-scan sonar on the vertical drag hook, and adjusting a vertical position of the vertical drag hook through a third nut to enable the vertical drag hook to hook the side-scan sonar;
g) installing the U-shaped hooks at two ends of the Z-shaped main cross beam, lifting the side-scan sonar through fourth bolts until an upper limb of a cross section of the side-scan sonar leans against vertical stop plates of the hanging rack;
h) adjusting again the vertical position of the vertical drag hook through the third nut to enable the vertical drag hook to hook tightly the hanging ring of the side-scan sonar;
i) aligning six second screw holes of the flange with six first screw holes of the hanging rack, and fastening the screw holes using bolts; and
j) lifting up the carrying device carrying the side-scan sonar using the lifting device and vertically placing the carrying device in a target water.

* * * * *